United States Patent [19]

Givens

[11] Patent Number: 5,531,463
[45] Date of Patent: Jul. 2, 1996

[54] SUPPORT ATTACHMENT FOR EASE IN SIDE EMPTYING A WHEELBARROW

[76] Inventor: Willie Givens, 32 Fairgate St., Rochester, N.Y. 14606

[21] Appl. No.: 417,820

[22] Filed: Apr. 6, 1995

[51] Int. Cl.⁶ .............................. B62B 1/18; B62B 5/00
[52] U.S. Cl. .................. 280/47.2; 280/47.31; 280/767; 298/2
[58] Field of Search .................. 280/47.2, 47.3, 280/47.31, 653, 659, 767; 298/2, 3, 175, 17 SG

[56] References Cited

U.S. PATENT DOCUMENTS

| | | | |
|---|---|---|---|
| 1,572,531 | 2/1926 | Henkel | 298/2 X |
| 1,804,403 | 5/1931 | Dowling | 298/3 X |
| 2,588,503 | 3/1952 | Dwyer | 280/47.31 X |
| 3,248,128 | 4/1966 | Grable et al. | 280/47.31 |
| 3,827,369 | 8/1974 | Mueller | 104/118 |
| 4,529,220 | 7/1985 | Wright et al. | 280/767 X |
| 5,067,737 | 11/1991 | Broeske | 280/47.31 |
| 5,242,177 | 9/1993 | Morris | 280/47.31 |

FOREIGN PATENT DOCUMENTS

| | | | |
|---|---|---|---|
| 1281947 | 12/1961 | France | 280/47.31 |
| 811424 | 8/1951 | Germany | 280/47.31 |
| 148618 | 1/1955 | Sweden | 280/47.2 |

Primary Examiner—Brian L. Johnson
Attorney, Agent, or Firm—Tom Givens

[57] ABSTRACT

An attachment for a wheelbarrow adapted to facilitate ease of tilting and manipulating the wheelbarrow while tilted on its sides. The attachment comprises a U-shaped bracket with the bottom portion of the U being positioned orthogonal to the front portion of a wheel of the wheelbarrow and the legs of the bracket extending along and attached to handles of the wheelbarrow. A wheel is attached to each leg of the U-shaped bracket closely adjacent the junction of the legs and the bottom of the U-shaped bracket and adapted to support the weight of the wheelbarrow when the tank of the wheelbarrow is tilted on either side by an operator.

12 Claims, 2 Drawing Sheets

SUPPORT ATTACHMENT FOR EASE IN SIDE EMPTYING A WHEELBARROW

BACKGROUND OF THE INVENTION

This invention relates generally to wheelbarrows, and more particularly, to an improvement in the form of an attachment for use with wheelbarrows that enables ease of emptying contents of a wheelbarrow from the sides of the wheelbarrow.

The wheelbarrow is probably the most commonly used device for transporting or hauling materials around a yard or work site. It is particularly adapted for unloading hauled material in piles by lifting handles in a vertical manner since the tray of the wheelbarrow is configured to allow material to easily slide forward, over the lip of the tray and out onto a deposit area. However, the standard wheelbarrow is not suited for depositing hauled material, for example, in a straight line whether that be into a trench when hauling concrete, dirt when gardening, or asphalt when topping a driveway or other flat surface. To use a wheelbarrow in this way, one usually tips it to the side being careful not to tip the tray too far and then drag the tray along the depositing path with the remote end of the handle scraping against the flat surface. To use a wheelbarrow in this way requires more than a modicum of strength, sense of balance and dexterity that is not possessed by most users. In addition, manipulating a wheelbarrow this manner can cause one to experience back pain.

PRIOR ART STATEMENT

Many different wheelbarrow devices are known for moving objects or materials, for example, U.S. Pat. No. 5,067,737 to Byron C. Broeske discloses a wheelbarrow that includes a pair of curved dumping rods that extend upward above a load box. The dumping rods each include a small wheel for rotating in a counter-clockwise direction which facilitates turning the wheelbarrow for emptying. George H. Morris in U.S. Pat. No. 5,242,177 shows an attachment for a wheelbarrow that includes a load support member pivotally secured to a frame of the wheelbarrow at a front end thereof and adapted to facilitate lifting and supporting of heavy or bulky items for transportation. The load support member is pivotally advanceable between a raised position and a lowered position such that, when the load support member is positioned in the lowered position, the load support member extends in front of the wheel of the wheelbarrow. The load support member is advanceable to the raised position when not in use. U.S. Pat. No. 3,827,369 to Harry B. Mueller discloses a wheelbarrow having a spherical wheel. The spherical wheel permits an operator to lift the wheel vertically from a track. None of the above-mentioned patents answer the need for a wheelbarrow that makes emptying materials in a straight line from the sides thereof easy.

Therefore, the aim of the present invention is to answer the need to make emptying contents out of the sides of a wheelbarrow easier and accomplishable by a wider variety of users with less strain on one's back.

SUMMARY OF THE INVENTION

Accordingly, the present invention provides an attachment for a wheelbarrow adapted to facilitate ease of tilting and manipulating the wheelbarrow while tilted on its sides. The attachment comprises a U-shaped bracket with the bottom portion of the U being positioned orthogonal to the front portion of a wheel of the wheelbarrow and the legs of the bracket extending along and attached to handles of the wheelbarrow. A wheel is attached to each leg of the U-shaped bracket closely adjacent the junction of the legs and the bottom of the U-shaped bracket and adapted to support the weight of the wheelbarrow when the tank of the wheelbarrow is tilted on either side by an operator.

BRIEF DESCRIPTION OF THE DRAWINGS

The foregoing and other features of the instant invention will be apparent from a further reading of the specification, claims and from the drawings in which:

While the present invention will be described hereinafter in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

The invention will now be described by reference to a preferred embodiment of the low cost, compact tank tilting enhancement for a wheelbarrow. However, it should be understood that the method and apparatus of the present invention could be used with any wheelbarrow or the like in which tilting of material moving equipment onto a particular side is desired.

In general, an improvement to prior material moving apparatuses is disclosed which is cost effective and space efficient and comprises the use of an attachment to existing wheelbarrows to promote additional use of the wheelbarrows through ease of manipulating material supporting tanks of the wheelbarrows onto their sides.

Figure 1:
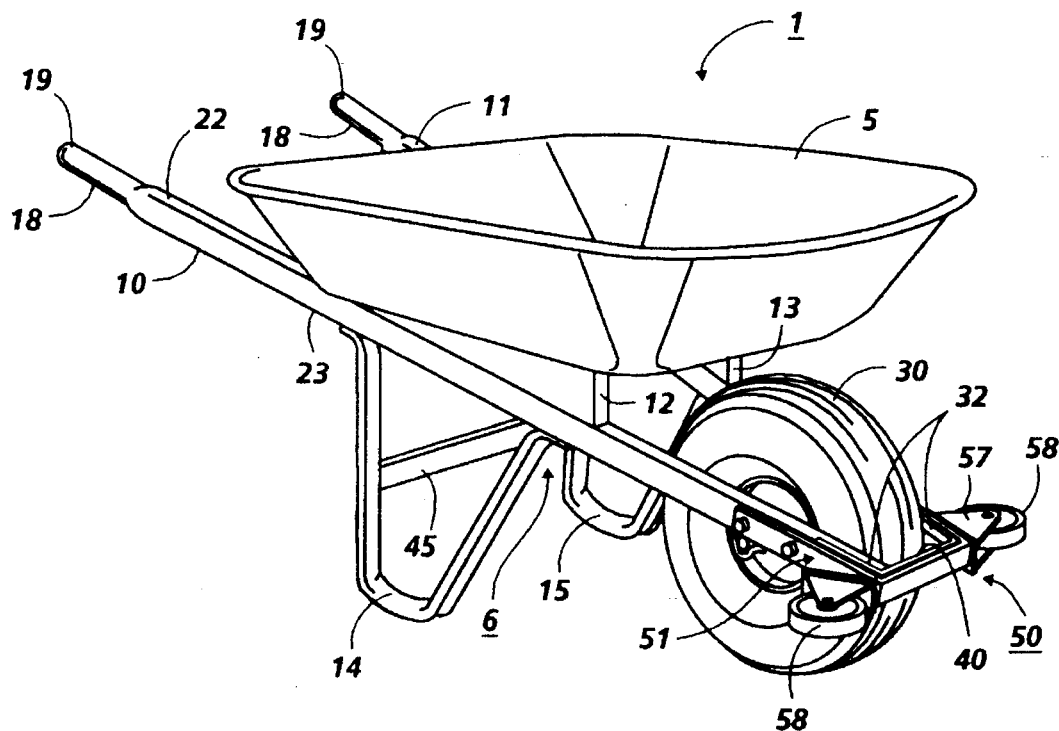
FIG. 1 is a schematic of a conventional wheelbarrow incorporating the attachment of the present invention.

The known wheelbarrow 1 shown in FIG. 1 consists basically of a tray 5 supported on a frame 6. The frame 6 comprises first frame side member or handle 10, a second frame member or handle 11, a first riser 12, a second riser 13, a first leg 14 and a second leg 15. The handles 10 and 11 generally comprise elongated wooden posts having a square or rectangular cross-section. Each handle 10 and 11 includes a rounded hand grip 18 at a rear end 19 thereof.

The first and second risers 12 and 13 are wedge shaped and are mounted on an upper surface 22 of the first and second handles 10 and 11, respectively, and the tray 5 is mounted on the upper surface of risers 12 and 13. The first leg 14 and the second leg 15 are secured to a lower surface 23 of the first and second handles 10 and 11. A wheel 30 is secured to an axle (not shown) which is rotatably secured to handles 10 and 11 by suitable brackets mounted to the lower surface 23 of each handle 10 and 11. The wheel generally extends in front of the tray 5. A front cross member or wheel guard 40 is secured to and extends between the front ends 32 of the first and second handles 10 and 11. The wheel guard 40 is secured to the handles 10 and 11 by bolts extending through a first and a second wheel guard bore hole formed near the end 32 of the handles 10 and 11. A rear cross member 45 extends between rear portions of legs 14 and completing the frame 6.

The legs 14 and 15 cooperate with the wheel 30 to support the wheelbarrow 1 in an upright alignment when the wheelbarrow 1 is not in use such that the tray 5 is generally level. When the wheelbarrow 1 is to be used to transport items, the operator grasps the handle grips 18 of the handles 10 and 11 and raises the rear end 19 of the handles 10 and slightly to pivot the handles 10 and 11 and the tray 5 about the axle such that the legs 14 and 15 are raised off of the ground and the front end 32 of the handles 10 and 11 are lowered slightly. With the legs 14 and 15 raised slightly off of the ground, the wheelbarrow 1 may be advanced from one location to another in a material transport mode.

Figures 3, 4:
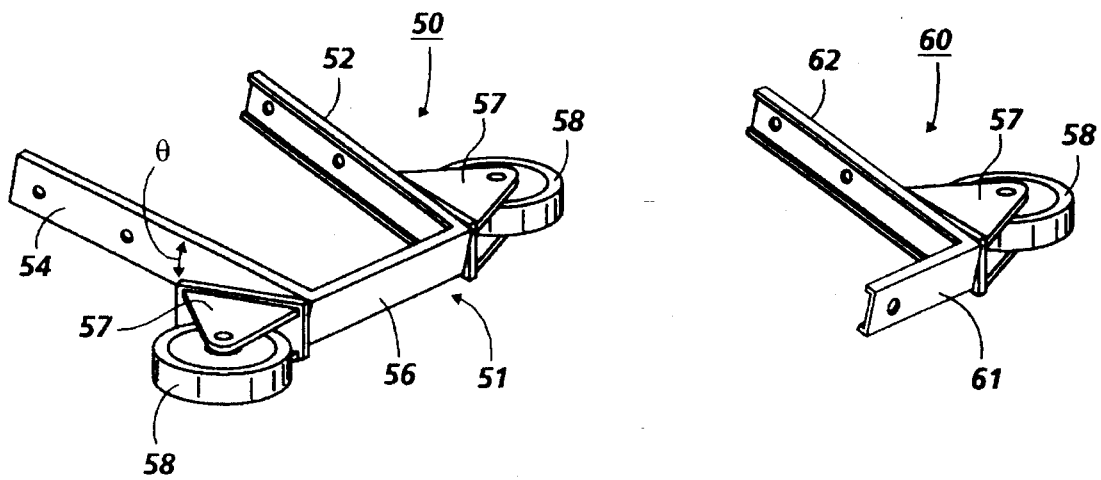
FIG. 3 is a schematic of the attachment in accordance with the present invention.
FIG. 4 is a schematic of an alternative embodiment of an attachment in accordance with the present invention showing a single wheel that can be mounted on either side of a wheelbarrow.
Figure 2:
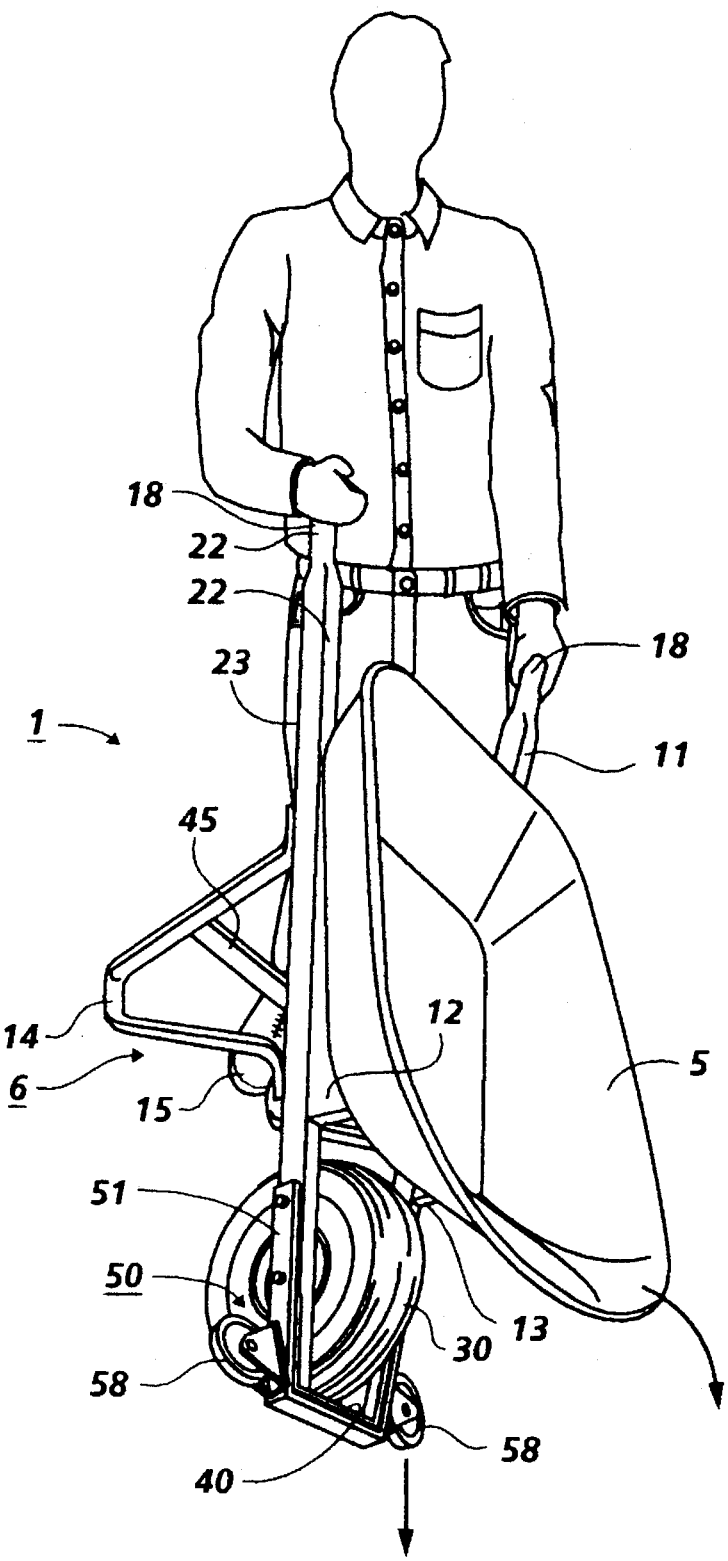
FIG. 2 is a schematic of the wheelbarrow of FIG. 1 showing the wheelbarrow tilted onto one side by an operator and supported by a roller.

The tray stabilizer attachment 50 of the present invention in FIGS. 1–3, generally comprises a U-shaped bracket 51 that has a pair of legs 52 and 54 that are attachable to handles 10 and 11 of wheelbarrow 1 by conventional means and a connecting portion 56 that fits over wheel guard 40. Attachment 50 has bracket mounted rollers 58 extending orthogonal to the sides of handles 10 and 11 and wheel 30. Rollers 58 are secured against swivel movement by their attachment to their mounting bracket 57 Mounting brackets 57 are attached to legs 52 and 54 at an angle Θ of about 5°–15° with respect to a plane alone the top or upper surface of legs 52 and 54 in order to ensure that the contents of tray 5 can be emptied in a straight line as the wheelbarrow is pulled by an operator. Even though stabilizer attachment 50 is shown attached to a conventional wheelbarrow, the attachment can be manufactured to any specification as to width between connection portion 56 and legs 52 and 54 and legs 52 and 54 could be of any desired length in order to be attached to a particular wheelbarrow size.

In operation, stabilizer attachment 50 allows for ease in manipulating tray 5 of the wheelbarrow 1 by tilting the tray 5 for side discharge of hauling contents as shown in i:16.2. As the tray is tilted, roller 58 contacts the ground or pavement, etc., while wheel 30 is lifted off the ground. With the weight of the materials in tray 5 now being supported only by roller 58, tray 5 can be moved in a straight line while depositing the materials in the tray in low heights as oppose to emptying the materials in a single pile as heretofore has been the practice and then spreading the single pile over a broad area. One advantage of being able to empty tray contents in a straight line is that the wheelbarrow can be manipulated by lighter weight operators, and another advantage is that spreading time is lessened since all of the material is not in a sole location in a single pile.

It should be understood that while an attachment to handles 10 and 11 is shown as the preferred embodiment of the present invention, it is also contemplated that brackets with rollers 58 could be mounted directly to the sides of handles 10 and 11, if desired, and that the attachment nor bracket has to be attached to the wheelbarrow when the wheelbarrow is initially assembled, but can be bought by an operator and attached to a wheelbarrow when need. In addition, as shown in FIG. 4, an alternative embodiment of the enhancement for emptying wheelbarrow tank contents from a side thereof, in accordance with the present invention, comprises an attachment 60 which includes an L-shaped member with legs 61 and 62 and having a bracket 57 and roller 58 connected thereto. This particular attachment is versatile in that it is adapted to fit handles 10 or 11 on either side of wheel 30 by simply disconnecting a conventional fastener (not shown) that holds the attachment to wheel guard 40, removing the attachment from one handle of the wheelbarrow, pivoting the attachment 180°, and reattaching it to wheel guard 40 and the opposite handle.

It is, therefore, evident that there has been provided in accordance with the present invention a low cost, compact wheelbarrow attachment that fully satisfying the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. An attachment for a wheelbarrow having a tray secured to a frame including a first member, a second member, and a wheel rotatably secured to said frame near a front end thereof, comprising:

a U-shaped member including a first leg, a second leg and a portion thereof connecting said first leg and said second leg at one end of each thereof;

a first bracket mounted wheel secured to said first leg a predetermined distance from one end of said first leg, and a second bracket mounted wheel secured to said second leg a predetermined distance from one end of said second leg, wherein said first bracket mounted wheel has an axis of rotation which is substantially parallel to the axis of rotation of said second bracket mounted wheel, and wherein each of said first bracket mounted wheel and said second bracket mounted wheel are substantially coplanar with said portion connecting said first leg and said second leg.

2. The attachment of claim 1, wherein said bracket mounted wheel is secured against swivel movement.

3. The attachment of claim 2, wherein said bracket mounted wheel is positioned at an angle of about 5° to 15° with respect to a plane parallel with a top surface of said first and second members of said frame.

4. The attachment of claim 1, wherein said bracket is attached to an L-shaped member.

5. A wheelbarrow having a tray secured to a frame including a first frame member and a second frame member; a first wheel with a first axis of rotation rotatably secured to and between said first and second frame members near a front end thereof; and an attachment adapted to be secured to at least one of said first and second frame members for enabling ease of emptying said tray from a side thereof, said attachment including a support member and a roller rotatably supported by said support member and adapted to support the weight of said wheelbarrow when the wheelbarrow is tilted onto one side and during movement of said wheelbarrow while said wheelbarrow is tilted on said one side, wherein said attachment is comprised of a second wheel with a second axis of axis of rotation which is substantially perpendicular to said first axis of rotation.

6. The attachment of claim 5, wherein said attachment further comprises a bracket mounted roller and wherein said bracket mounted roller is positioned at an angle of from about 5 to about 15 degrees with respect to a plane parallel with a top surface of said first and second members of said frame.

7. The wheelbarrow of claim 5, wherein said attachment comprises a U-shaped member with said support member and said roller that is supported by said support member being secured to legs of said U-shaped member.

8. A wheelbarrow having a tray secured to a frame including a first frame member and a second frame member; a wheel rotatably secured to and between said first and second frame members near a front end thereof; and an attachment adapted to be secured to at least one of said first and second frame members for enabling ease of emptying said tray from a side thereof, said attachment including a support member and a roller rotatably supported by said support member and adapted to support the weight of said wheelbarrow when the wheelbarrow is tilted onto one side and during movement of said wheelbarrow while said wheelbarrow is tilted on said one side, wherein:

(a) said attachment comprises a U-shaped member with said support member and said roller that is supported by said support member being secured to legs of said U-shaped member, and (b) said wheelbarrow comprises a wheel guard extending across and secured to said front end of said first and second frame members with an inner surface of said U-shaped attachment being positioned against and secured to a surface of said wheel guard.

9. The wheelbarrow of claim 8, wherein said roller supported by said support member is secured against pivotal movement.

10. The wheelbarrow of claim 8, wherein said attachment comprises an L-shaped member with said support member and said roller that is supported by said support member being secured to a portion of said L-shaped member.

11. The wheelbarrow of claim 8, wherein said support member is a bracket with said roller being rotatably connected thereto.

12. The wheelbarrow of claim 8, wherein said support member is a bracket connected directly to at least one of said first or second frame members.

* * * * *